(12) United States Patent
Prigge et al.

(10) Patent No.: US 12,510,261 B2
(45) Date of Patent: Dec. 30, 2025

(54) AIR PURIFIER WITH NOISE MITIGATION FEATURE

(71) Applicant: Vitality Ventures HK Company Limited, Mill Valley, CA (US)

(72) Inventors: Grant Prigge, Belvedere-Tiburon, CA (US); Yordan Konstantinov Kralev, Sofia (BG)

(73) Assignee: Vitality Ventures HK Company Limited, Mill Valley, CA (US)

( * ) Notice: Subject to any disclaimer, the term of this patent is extended or adjusted under 35 U.S.C. 154(b) by 458 days.

(21) Appl. No.: 18/076,761

(22) Filed: Dec. 7, 2022

(65) Prior Publication Data

US 2023/0324072 A1    Oct. 12, 2023

Related U.S. Application Data

(60) Provisional application No. 63/287,347, filed on Dec. 8, 2021.

(51) Int. Cl.
*F24F 11/70*      (2018.01)
*F24F 13/24*      (2006.01)
*F24F 120/10*     (2018.01)

(52) U.S. Cl.
CPC .............. *F24F 11/70* (2018.01); *F24F 13/24* (2013.01); *F24F 2120/10* (2018.01)

(58) Field of Classification Search
CPC .. F24F 11/70; F24F 11/63; F24F 11/77; F24F 13/24; F24F 2120/10; F24F 8/10; Y02B 30/70
USPC ......................................................... 454/254
See application file for complete search history.

(56) References Cited

U.S. PATENT DOCUMENTS

| | | | |
|---|---|---|---|
| 2006/0000257 A1* | 1/2006 | Samadpour ............ | G16H 50/80 73/29.01 |
| 2015/0306533 A1* | 10/2015 | Matlin .................... | F24F 8/158 96/417 |
| 2020/0398637 A1* | 12/2020 | Chang .................... | G08B 21/22 |

* cited by examiner

*Primary Examiner* — Steven B McAllister
*Assistant Examiner* — Charles R Brawner
(74) *Attorney, Agent, or Firm* — Maxwell J. Petersen; FisherBroyles, LLP

(57) ABSTRACT

The present invention relates generally to the field of air purifiers, and more particularly to an air purifier having a control system providing a noise mitigation feature that detects when an ambient space is occupied and provides for decreased fan speed, resulting in decreased fan noise, during periods of time in which the ambient space is determined to be occupied.

15 Claims, 4 Drawing Sheets

AIR PURIFIER WITH NOISE MITIGATION FEATURE

FIELD OF THE INVENTION

The present invention relates generally to the field of air purifiers, and more particularly to an air purifier having a control system providing a noise mitigation feature that detects when an ambient space is occupied and provides for decreased fan speed, resulting in decreased fan noise, during periods of time in which the ambient space is determined to be occupied.

DISCUSSION OF RELATED ART

The growing effect of pollution and global warming are increasing the need for air purifiers to improve indoor air quality. Typical air purifier products use a fan to drive intake air from a room through filtration media, such as high-efficiency particulate air (HEPA) filters, to remove harmful airborne particulates from the air, and then exhaust cleaned, filtered air back into the room. More specifically, many conventional air purifiers create airflow through the HEPA filter with the help of a brushless DC fan with a rotational frequency in the range of 500 to 3000 rpm.

This fan-based arrangement generates acoustic noise. The noise produced during fan operation is due to multiple factors, including the use of a mechanical bearing, airflow through the filter, and interaction between airflow and the device's housing. Usually, mechanical noise is reduced during device design, so the dominating noise sources are typically pressure fluctuations across the air path. When the fan speed increases, flow rate increases, and as a result, the amount of device-generated noise also increases. Accordingly, relatively higher fan speeds result in relatively more air cleaning, but also result in greater noise, which can be unpleasant, distracting, or overwhelming to persons in the room, especially when combined with other indoor and outdoor sources of acoustic noise. Accordingly, an air purifier may improve the room air quality with an associated cost of increasing room noise pollution.

Air-purifier perceived noise power often falls in the range of 30 to 80 decibels. Because the decibel scale is logarithmic measurement units, such units cannot be added linearly. For example, a doubling of the power of a noise source or adding another noise source at the same frequency gives a total increase in perceived noise power of 6 dB (not 4). Accordingly, any added source of ambient can be significant.

Further, because air purifiers are generally designed to run continuously or for long periods of time, the human room occupants may become exposed to prolonged periods of undesirably high noise levels. Ambient noise levels have been widely investigated in science and various health guidelines and government regulations exist in the field in relation to noise level exposure. Exposure to prolonged or excessive noise has been shown to cause a range of health problems ranging from stress, poor concentration, productivity losses in the workplace, and communication difficulties and fatigue from lack of sleep, to more serious issues such as cardiovascular disease, cognitive impairment, tinnitus and hearing loss. In 2011, the World Health Organization (WHO) released a report titled 'Burden of disease from environmental noise' claiming that at least one million healthy years of life are lost each year in Europe alone due to noise pollution (and this figure does not include noise from industrial workplaces).

Conventional air purifiers include a manually-operated ON/OFF switch and are designed to run continuously when the switch is set to the ON position. Some conventional air purifiers have manually-adjustable (e.g., LOW, MEDIUM and HIGH) fan speeds that can be used to manually increase or decrease the fan speed. The fan speed setting impacts the amount of air purification, with the HIGH fan spend setting providing greatest air cleaning. However, relatively higher fan speeds result in relatively higher noise, which can be unpleasant, distracting, or overwhelming to persons in the room. The spontaneous user reaction to excessive noise produced by an air purifier is to adjust the device to quieter operation by switching it to lower-speed mode. Accordingly, the fan speed may be manually adjusted by a person present in the room to lower the fan speed, with the desired result of reducing noise, and the undesirable result of reducing air cleaning. Some air purifiers may allow for making of a manual adjustment to fan speed from a remote location, e.g., via a smartphone app in communication with the air purifier.

Some conventional air purifiers have control systems that allow for monitoring of the "dirtiness" of the air, automatic adjustment of the fan speed to increase fan speed and filtration on an as-needed basis. Accordingly, for example, when a level of fine particulate matter is elevated in the room, a conventional purifier may resultingly increase its fan speed in order to increase the airflow through the HEPA filter and hence increase the filtration rate. However, the amount of noise generated during this increased fan speed period is usually disturbing to the user, who can use the device functions to manually limit the maximum fan speed and/or decibels generated, which resultingly decreases the filtering efficiency.

Some currently available air purifiers include a particle sensor to show the user what the air quality is in their home by way of certain standards, such as air quality index (AQI). AQI is generally known as a function of the amount of particles in the air having a diameter of 2.5 microns or less (PM 2.5). In the USA, standards for correlation between AQI and PM 2.5 are used, and user's need to use trial and error to reach a desired AQI.

Many human activities in a room tend to elevate AQI (decrease air quality) for short periods of time. Those activities include cooking, smoking, playing physical games/sports, etc. Accordingly, it is helpful to keep baseline room AQI at a relatively low levels, to minimize the eventual peak values that will be reached during such activities.

Yet other currently available air purifiers have an "Auto" fan speed feature. Such feature uses a simple if/then function to set fan speed based on certain thresholds in AQI. For example, such a feature may function as follows: if AQI is between 0-50, then set fan speed to low; if AQI is between 51-100, then set fan speed to medium, or if AQI is over 101, then set fan speed to high. The problem with such features is that each air purifier manufacturer uses different thresholds of AQI ranges. That is, each manufacturer has their own air quality ranges for good, medium or bad air qualities and for low, medium, or high fan speeds. For example, some companies market how quiet their air purifier is, but they achieve quietness by increasing the permissible particulate threshold levels. The result may be an air purifier that is so quiet that it does not remove an effective amount of the harmful air particles. Because such information is not shared with the consumer, the consumer does not know whether the air purifier is, in fact, effective.

What is needed is an air purifier that can determine when an ambient space is unoccupied, and provide for increased fan speed and associated increased air filtration during periods of time in which the ambient space is unoccupied, to reduce baseline AQI and avoid disturbances caused by high fan speeds.

SUMMARY

The present invention provides an air purifier that avoids or limits generation of excessive noise that may be disturbing to or unhealthy for a human room occupant. More particularly, the present invention provides an air purifier that can determine when an ambient space is occupied by humans that may be disturbed by excessive noise, and that can provide for decreased fan speed and associated decreased generated noise during periods of time in which the ambient space is determined to be occupied.

BRIEF DESCRIPTION OF THE FIGURES

An understanding of the following description will be facilitated by reference to the attached drawings, in which.

DETAILED DESCRIPTION

Generally, operation of air purifiers to improve air quality, in a relatively short period of time, involves operation of the air purifier's fan at a higher fan speed, which necessarily results in increased noise that can be disturbing to room occupants. In other words, increased air purification is desirable but is typically associated with increased noise/noise pollution. The present invention provides an air purifier that can determine when an ambient space is unoccupied, and that provides for increased fan speed and associated increased air filtration during periods of time in which the ambient space is unoccupied, to provide for overall improved air quality while also avoiding disturbances to room occupants caused by higher fan speeds used for increased air filtration performance.

Figure 1:
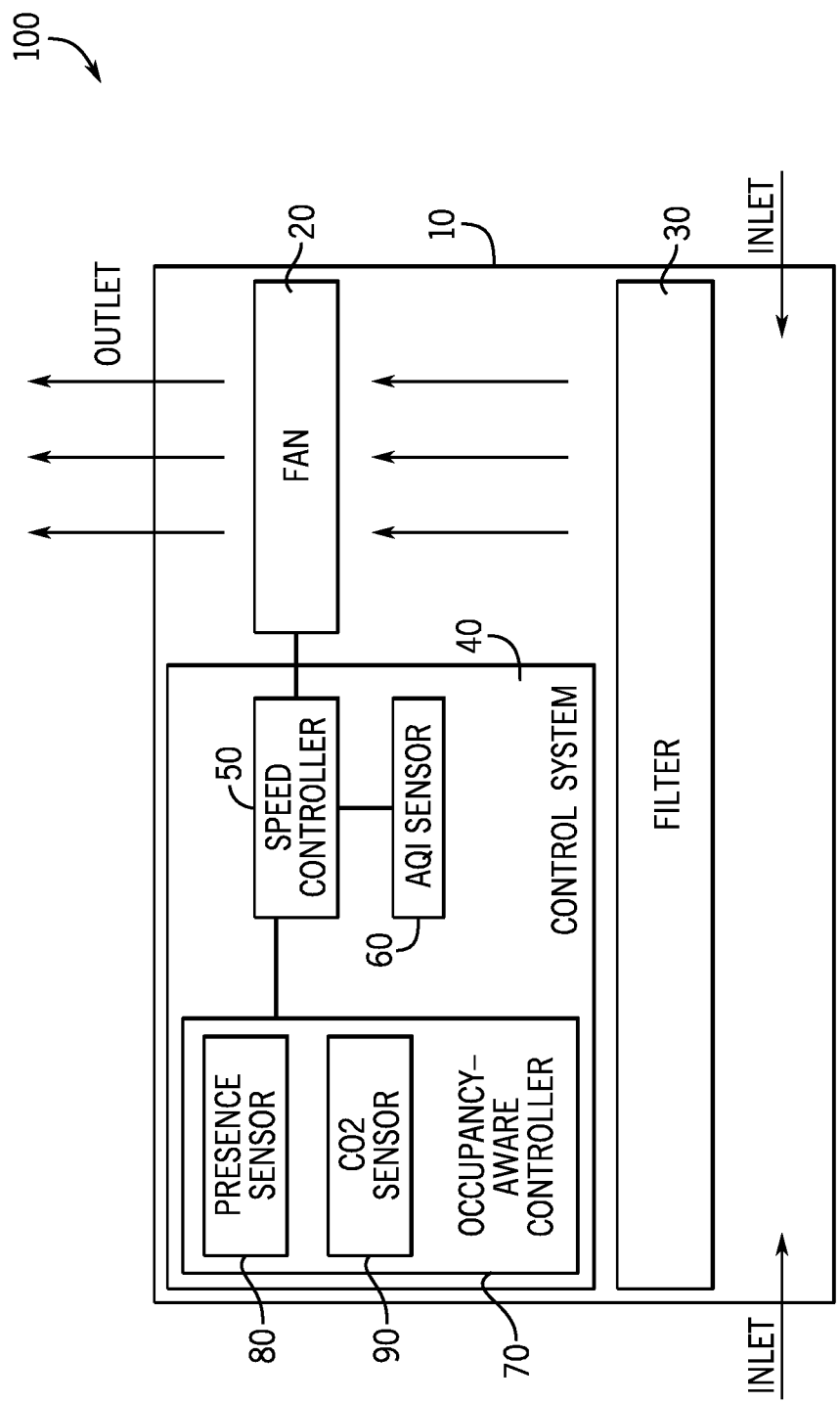
FIG. 1 is a schematic illustrating the separate components of an exemplary air purifier having a control system in accordance with an exemplary embodiment the present invention.

FIG. 1 is a schematic illustrating an exemplary air purifier 100 having a control system providing a selective cleaning feature in accordance with an exemplary embodiment the present invention. As shown in FIG. 1, the exemplary air purifier 100 includes a housing 10 supporting a motorized fan 20 for drawing inlet air (ambient room air) into the housing 10 and through a filter 30, such as a HEPA filter comprising HEPA filtration media, and then exhausting the filter/purified air from the housing 10 in a manner resembling that of the prior art, and with such other electrical and/or other components typical of air purifiers, as will be appreciated by those skilled in the art.

As is typical of many conventional air purifiers, the exemplary air purifier further includes a control system 40 that includes a speed controller 50 operatively connected to the fan 20 (or more particularly, the fan's motor), to provide a suitable signal to the fan motor to control the fan and thus the speed of the fan's fan blade. As will be appreciated by those skilled in the art, the control system may comprise a printed circuit board supporting electrical components that implement suitable logic for controlling the fan 20.

Generally speaking, the control system 40 ensures a sufficient airflow through the filter media 30 in order to reduce the density of particulate pollution in the indoor airspace in light of generally unknown and uncontrollable external disturbances such as outdoor pollution density, room occupancy activities, cooking, etc. The performance of the air purifier control system is effectively limited by the hardware capabilities of the device in terms of achievable CADR, filter efficiency, sensor selectivity and sensitivity as well as by the extent of the external disturbances. The control system 40 is composed of hardware level and software level layers. With respect to the hardware level, the control system relies primarily on the AQI particulate sensor 60 and fan speed controller 50. However, additional sensors/actuators such as a proximity sensor, a pressure sensor or a gas sensor might be included to further improve the performance of the air purifier 100. With respect to the software level, the control system 40 is implemented as an executable entity in a dedicated microcontroller integrated circuit (IC). The control algorithm is commonly performing discrete-event functions such as starting/stopping the fan when commanded by the user or in response to threshold levels of indoor pollutants. As another higher level of control, the air purifier 100 may implement a feedback controller, which allows a proportional acceleration of the fan 20 in response to measured indicators of pollution. Generally, the control software of the air purifier is a composition of various loops of control dedicated to various functions requested by the device.

In this exemplary embodiment, the control system 40 includes an AQI sensor 60 for determining air quality on an air quality index (AWI) scale as a function of particulate matter distribution observed in the ambient air by the AQI sensor. The exemplary sensor detects the mass density of particles within a specific range of aerodynamic diameters. Typical particle size thresholds employed are 0.3, 0.5, 1.0, 2.5, 5.0 and 10.0 micrometers. AQI is obtained according to the established international standards. As will be appreciated by those skilled in the art, the AQI sensor 60 may include any suitable hardware, such as an optical-based particle counter exploiting Mie scattering theory, where a laser emits a testing impulse towards the testing chamber put on the path of particulate dense air flow, and consequently the scattered light is detected by one or several detectors. There are other more accurate means to infer the particle distribution in the air such as mass collectors or spectrometers, and any suitable hardware may be used. However, optical-based sensors are often deemed most suitable for use in domestic air-purifiers. In this exemplary embodiment, the speed controller 50 of the control system 40 is configured to vary fan speed according to predetermined logic, as a function of air quality data obtained by the AQI sensor 60, e.g., in a manner consistent with approaches in the prior art. In this example, the speed controller 50 is configured to determine a suitable fan speed as a function of AQI sensor data such that the fan speed is relatively higher (for relatively more air filtration/air cleaning) when the AQI sensor 60 indicates a relatively low level of air quality (e.g., high level of particulate matter) and such that the fan speed is relatively lower (for relatively less air filtration/air cleaning) when the AQI sensor 60 indicates a relatively high level of air quality (e.g., low level of particulate matter). Various sensors and techniques for determining/varying fan speed are known in the art, and any suitable sensors, logic and/or techniques may be used for this primary determination of fan speed consistent with the present invention.

In accordance with the present invention, the control system 40 further includes an occupancy-aware controller 70. The occupancy-aware controller 70 is generally responsible for determining when a room or similar environment of the air purifier is occupied by humans, and for providing a suitable signal to the speed controller 50 so that the determination of room occupancy can be used as an additional factor in determining/varying fan speed, consistent with the present invention. More particularly, the occupancy-aware controller 70 provides what may be referred to as a "quiet mode" function that provides for relatively lower fan speeds (and thus decreased fan speed-related noise) during periods in which the room/environment of the air purifier is determined to be occupied by one or more humans, to avoid disturbances to nearby humans that would be caused by a relatively higher fan speed.

By way of further example, the occupancy-aware controller 70, acting in concert with the speed controller 50, may cause the fan 20 to be controlled to provide a lower fan speed than would otherwise be determined to be appropriate based on the AQI sensor and/or other sensors apart from consideration of room occupancy as determined by the occupancy-aware controller 70, e.g., when the room is determined to be occupied.

As shown in FIG. 1, the exemplary occupancy-aware controller 70 includes a presence sensor 80 for detecting when humans are in proximity to the air purifier, e.g., in the same room, and a $CO_2$ sensor 90 for determining $CO_2$ levels in the ambient air. It should be noted that in some embodiments, the $CO_2$ sensor 90, and output from the $CO_2$ sensor, may also be considered by the speed controller for determination of a suitable fan speed apart from the functionality of the occupancy-aware controller 70.

The presence sensor 80 may be any suitable sensor, such as an infrared sensor, Bluetooth® receiver, a lidar sensor and/or a radar sensor. As will be appreciated by those skilled in the art, such sensors are usable to determine whether one or more humans are present in the vicinity of the air purifier. By way of example, the presence sensor 80 may include a doppler radar sensor, and the speed controller 50 (or a sub-controller component of the occupancy-aware controller 70) may use data received from the doppler radar sensor to analyze a phase delay in a detected by a doppler radar signal that is determined by suitable logic to be indicative of a presence of one or more humans in the vicinity of the air purifier. By way of example, this doppler radar approach works particularly well for detecting motion of large objects around the purifier device, but has limitations, for example, with respect to smaller and/or immobile objects, such as a slow-moving or sedentary human.

The $CO_2$ sensor 90 may be an infrared-based photo-sensor or alternatively a metal oxide semiconductor (MOX) based sensor for volatile organic compounds (VOC) from which the $CO_2$ is estimated, or other sensor disposed for determining a $CO_2$ level in ambient air, e.g., outside of or as it passes through the air purifier 100. As will be appreciated by those skilled in the art, such a sensor is usable to determine whether one or more humans are present in the vicinity of the air purifier as reflected by an increased $CO_2$ level associated with the presence and expiration of $CO_2$ by one or more beings in the vicinity of the air purifier. By way of example, the $CO_2$ sensor 90 and the speed controller 50 (or a sub-controller component of the occupancy-aware controller 70) may use data received from the $CO_2$ sensor 90 to analyze a gradual increase in ambient $CO_2$ level that is determined by suitable logic to be indicative of a presence of one or more humans in the vicinity of the air purifier 100. For example, this can be done by determining carbon dioxide levels in the room above environmental $CO_2$ levels (which may be determined for example by accessing a public meteorological database for monitoring ambient $CO_2$ level through time and location), which are often around 411 ppm. If the $CO_2$ levels are elevated, then it may be considered that at least one human is present. By way of further example, the room's natural ventilation rate/ACH (determined by estimating the asymptotic rate of decrease of $CO_2$ or VOC gas measured by the respective sensor), room volume (determined by user specified room volume in combination with an automatic room volume correction algorithm based on deviation between predicted and actual time to clean the particulate matter in the room) and/or average $CO_2$ level associated with human breathing (e.g., a known figure) may be further accounted for to determine a number of occupants in the room, or that at least one occupant is present. The information about the room occupancy state may be useful because speeding up the air purifier's fan 20 would eventually generate elevated levels of acoustic noise, which might be disturbing for the occupants. On the other hand, a simple proximity sensor mounted in the purifier (for example an RF radar based sensor) to detect proximity may not be enough to ensure that room is unoccupied because in certain activities, such as sitting or sleeping, the local proximity sensor might not detect any motion in the room. By way of example, this approach works particularly well for detecting motion of large objects around the purifier device, but has limitations, for example, with respect to smaller and/or immobile objects, such as a slow-moving or sedentary human.

In certain embodiments, only a presence sensor 80 or a $CO_2$ sensor 90 may be used for the determination of occupancy. However, this has some potential disadvantages. For example, if only a doppler radar is used and the human occupant is just sitting without moving in the room, then the occupancy might be wrongly inferred. In such a situation the $CO_2$ level will slowly rise, however. On the other hand, relying solely on the $CO_2$ level to determine the room occupancy may not be sufficiently reliable because accumulation of $CO_2$ in a large room can be slow and misleading. Accordingly, in a preferred embodiment, multiple sensors are used in the determination of occupancy state (occupied or unoccupied). For example, the occupancy may be judged by a combination of three signals—phase delay detected by doppler radar, carbon dioxide levels in the room above the environment $CO_2$ levels (e.g., around 411 ppm), and room natural ventilation rates (home ACH). Natural ventilation rate is useful in determining the rate of exchange of air between indoor and outdoor spaces, hence, a certain level of $CO_2$ detected in the room will indicate different levels of occupancy depending on the home ACH. A relatively high level of $CO_2$ with a low level of home ach might indicate no occupancy, while in another situation with a low level of $CO_2$ but high home ach might mean presence in the room. Use of multiple sensors and indications of occupancy in the occupancy determined may help to more reliability determine the room's occupancy state.

Figure 2:
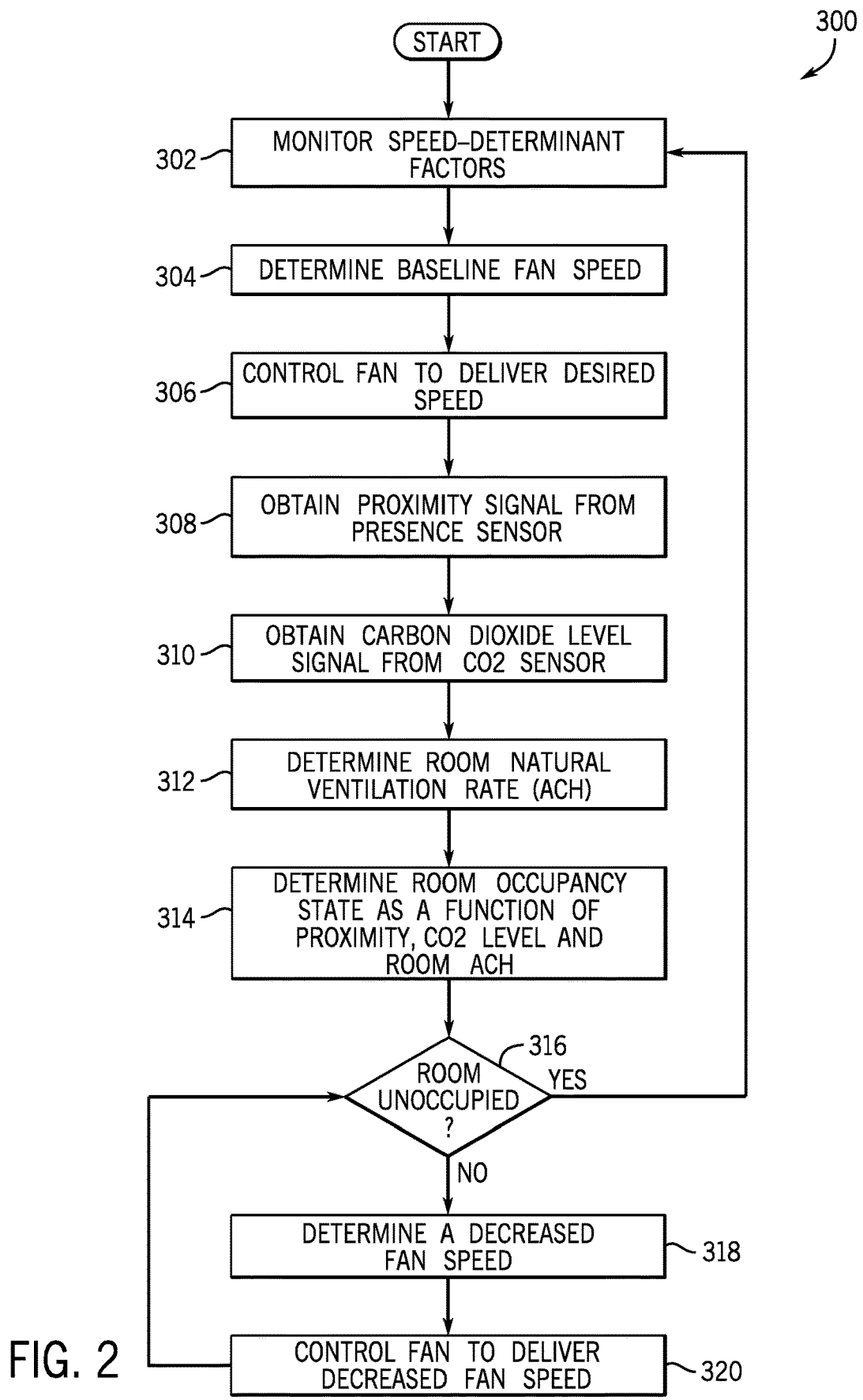
FIG. 2 is a flow diagram illustrating an exemplary method operation of the exemplary air purifier of FIG. 1.

FIG. 2 is a flow diagram 300 illustrating an exemplary method operation of the exemplary air purifier 100 of FIG. 1. Referring now to FIG. 2, the method can begin with the control system 40 of the air purifier 100 monitoring speed-determinant factors, as shown at 302. This may include, for example, the speed controller 50 monitoring a position of a manually-operated fan speed switch and/or receiving data/signals from any of a plurality of sensors of the air purifier, according to the configuration of the air purifier. In the example of FIG. 1, this may involve monitoring of particulate matter via the AQI sensor 60 and/or other sensors.

Next, the method can involve determining a baseline fan speed, as shown at 304. This may be performed in any suitable fashion, according to the configuration of the air purifier 100. In the example of FIG. 1, this involves the speed controller 50 receiving data from at least the AQI sensor 60 and determining a suitable fan speed according to suitable logic and/or programming of the speed controller 50. For example, the speed controller 50 may determine a fan speed suitable (e.g. 70% of maximum speed) for reaching a suitable AQI level within a fixed period of time, e.g., 20 minutes. Next, the method involves controlling the fan to deliver the desired fan speed (e.g., 70% of maximum speed), as shown at 306. This may involve the speed controller 50 transmitting a certain data or other control signal to the motor or motor controller of the fan 20. Steps 302-306 may be performed in a conventional or generally conventional fashion.

Next, in the example of FIG. 1, the exemplary method can involve obtaining of a proximity logical data signal from the presence sensor 80, as shown at 308. This may involve use of the presence sensor 80, and receipt of a corresponding signal from the presence sensor 80 at the speed controller 50.

Next, in the example of FIG. 1, the exemplary method can involve obtaining ambient air $CO_2$ level data signal from the $CO_2$ sensor 90, and proximity data from the presence sensor 80, as shown at 310. This may involve use of the $CO_2$ sensor 90, and receipt of a corresponding signal from the $CO_2$ sensor 90 at the speed controller 50.

Next, in the example of FIG. 1, the exemplary method can involve determining room natural ventilation rate (ACH), as shown at 312. This can be determined by estimating $CO_2$ signal decay rate towards ambient levels through a recursive identification procedure of a first order differential dynamical model for the $CO_2$ concentration in the room.

Next, in the example of FIG. 1, the exemplary method can involve determining a room occupancy state (occupied or unoccupied by persons) as a function of the proximity data, $CO_2$ level data and room ACH rate, as shown at 314. This can be determined by employing a mathematical model for the room occupancy with variables: number of occupants, breathing rate, room ach and $CO_2$ level. In this model the breathing rate is assumed constant, the room ACH is estimated as described above and $CO_2$ level is measured by the $CO_2$ sensor or infrared from the VOC sensor. Hence the only unknown in this model is the number of occupants breathing, which can be determined by an adaptive filtering algorithm that modifies the number of occupants in until the predicted $CO_2$ level by the currently assumed number of occupants is fit to the actually measured $CO_2$ level. In this process the accuracy of the room ACH plays a critical role since it determines the balance between $CO_2$ source rate and $CO_2$ sink rate to the environment.

Next, the method can involve determining the occupancy state, as shown at 316. If the room is unoccupied (meaning it is not in the occupied state), then the method flow continues to 302, at which point the determined baseline fan speed (e.g., 70% of maximum speed) is maintained or redetermined based on current speed determinant factors, as shown at 302-306.

However, if it is determined at 316 that the room is not unoccupied (meaning it is in the occupied state), then the method flow continues to 318, at which point the speed controller 50 determines a decreased fan speed. The decreased fan speed may be determined in any suitable fashion. For example, this may involve setting the fan speed to a predetermined speed less than maximum speed (e.g., 20% of maximum speed), applying a predetermined decrease to the otherwise-determined fan speed, or determining a suitable lower fan speed for achieving a desired fan-related noise level, according to logic implemented at the speed controller 50.

Next, the method can involve controlling the fan to deliver the increased fan speed (e.g., 20% of maximum speed), as shown at 320. This may involve the speed controller 50 transmitting certain data or a control signal to the motor or motor controller of the fan 20.

In this example, the method flow continues to 316, and the decreased fan speed is maintained until it is determined at 316 that the room is unoccupied. At that time, the method returns to step 302 and the desired baseline fan speed can be maintained until the room is again occupied. It will be appreciated that in other embodiments, the method flow may be different. For example, the method may involve maintaining the increased fan speed for a predetermined period of time, or until desired AQI/air purification level is obtained, etc.

In any case, the present invention provides for occupancy-aware control of fan speed, to cause decreased/lower fan speeds during periods that the vicinity of the air purifier 100 is determined to be occupied, to avoid disturbing occupants in the vicinity of the air purifier with increased noise associated with increased fan speeds.

Figure 3:
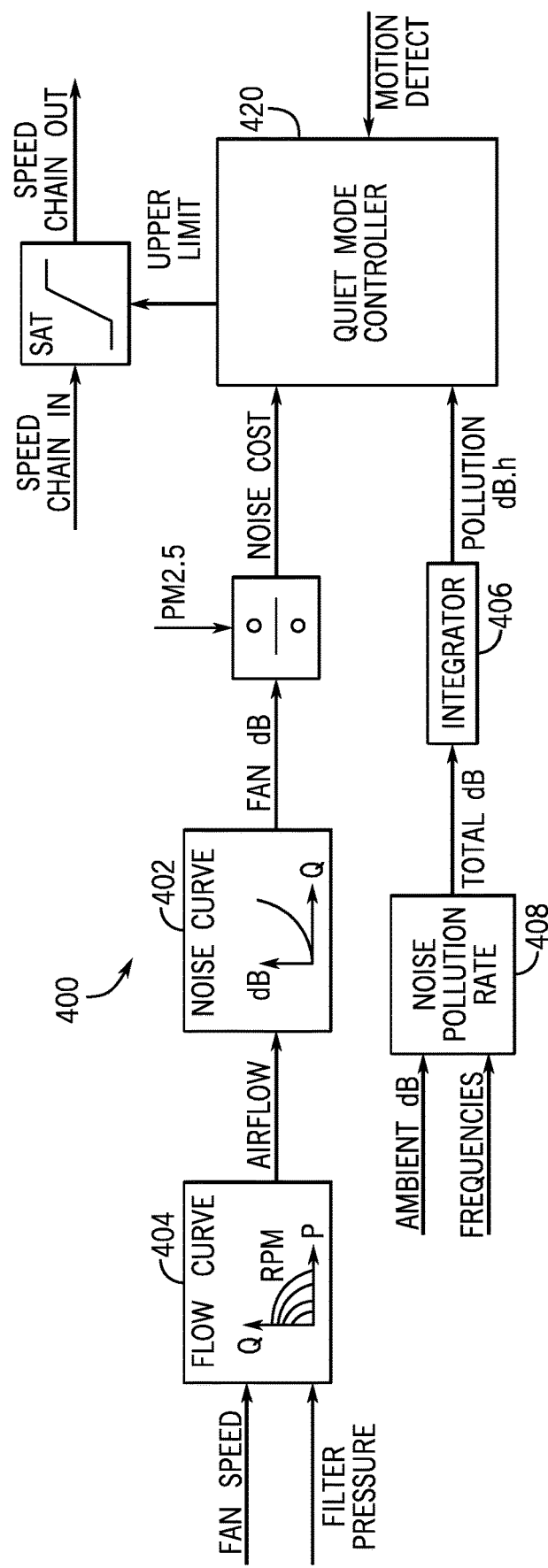
FIG. 3 is a schematic illustrating a dataflow diagram for determining fan speed in accordance with an exemplary embodiment of the present invention.

In this exemplary embodiment, the operation of the air purifier is dependent on selection of a desired (e.g., optimal) fan speed. Since the fan speed is affected by a lot of modes, a priority chain may be constructed where speed from a lower priority mode is merged with the speed of the current mode and fed to the next high priority mode, as shown in FIG. 3. FIG. 3 shows a schematic illustrating a dataflow diagram 400 for determining an upper limit of fan speed in accordance with an exemplary embodiment of the present invention. The illustrated dataflow diagram 400 includes a more complex quiet mode controller 420 that acts as the speed controller 50. The quiet mode controller 420 receives motion detection input from the occupancy-aware controller 70. Additionally, the quiet mode controller 420 receives fan noise data for the fan 20 which can be determined based on a noise curve 402 for air flow, which air flow is determined based on a flow curve 404 that accounts for fan speed and filter pressure. The quiet mode controller 420 also receives noise pollution data from an integrator 406 that determines a noise pollution rate 408 based on sound amplitude and frequency.

The illustrated merge operation may involve either taking the maximum between the previous and the current speed, replacing the previous speed with the current speed, or saturating the current fan speed. In the case of acoustic noise reduction, the merge operation is a "saturation operation" which limits the maximum fan speed after the subsystem. The saturation operation effectively places an upper (and/or lower) bound over the signal level, such that the dynamic range of the signal is restricted to a desired range. In this case, the saturation operation prevents the fan from accelerating beyond a certain speed level. The saturation is not happening instantaneously but with a certain predefined slope. In an exemplary embodiment, the upper limit of the fan speed may be calculated from the quiet mode controller 420 that takes 3 inputs, namely, the motion detect signal, a fan noise cost signal, and an ambient noise pollution signal.

As described above, the motion may be detected in the room with a sensor working on the doppler principle measuring the phase delay between emitted and received radio waves. The noise cost signal may reflect the relationship between concentration of particles with a diameter smaller than 2.5 µm (expressed as micrograms per cubic meter) and purifier emitted noise (expressed as decibels). The level of self-generated noise may be obtained from a noise curve according to the instantaneous airflow measured in cubic meters per second. The air flow in its turn may be obtained from a specific fan flow curve taking into account the current fan speed and pressure drop across the fan (or equivalently across the HEPA filter). The noise cost signal therefore provides an indication of the amount of benefit of increasing the air purifier noise with 1 dB in terms of particle concentration.

Hence, it will be appreciated that the higher the particle density is, the benefit of introducing more noise in the environment by speeding up the fan is relatively higher. On the other hand, a noise pollution metric may be calculated, expressed as decibel-hours, indicating an accumulated effect of the introduced environment noise. The estimation of that noise pollution level may be based on integrating total ambient noise power, expressed in decibels over time. The current ambient noise level is partially due to the air purifier—generated noise, and is also due to other environmental factors such as noises from other household appliances or outdoor noise passing through the windows. The calculation of this ambient noise power can either be based on a direct measurement with a microphone and spectrum analysis, or can be assumed based on the room function, home age, home location and of course the current fan speed of the air purifier. In both cases, the noise pollution level indicates the long term accumulation of noise levels in a particular room. The goal of the Quiet Mode aspect of the controller/control circuit is to take into account all these factors and select the most appropriate upper limit for the fan speed, hence, limiting the noise generated by the air purifier device.

Figure 4:
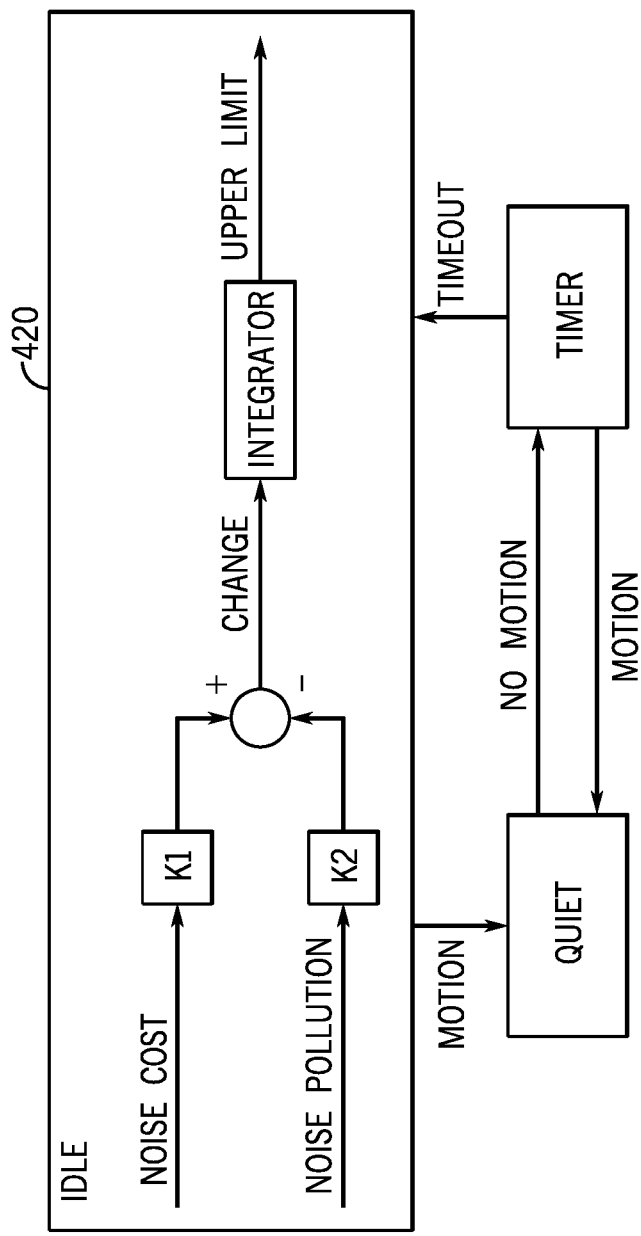
FIG. 4 is a schematic illustrating exemplary states of a control system for determining fan speed in accordance with an exemplary embodiment of the present invention.

The selective noise mitigation operation may be driven by a so-called Quite Mode state machine (see FIG. 4) in which the quiet mode controller 420 determines a new lower/decreased speed level based on the room occupancy. FIG. 4 shows a schematic illustrating exemplary states of a quiet mode controller 420 for determining fan speed in accordance with an exemplary embodiment of the present invention. Accordingly, for example, after the room is detected to be in the occupied state, the Quiet Mode state machine decides what will be the updated upper bound speed for the air purifier's fan speed, e.g., based on the current AQI levels, current fan speed and fan speed reference and current user preferences.

Accordingly, the quiet mode controller 420 may be implemented as a state machine (FIG. 4), in which the default state is the idle state, when no motion is detected. During the idle state, the upper limit is the result of interaction between instantaneous levels of noise cost signal and noise pollution signal. The noise cost signal leads to an increase of the upper limit, allowing high fan speeds to be reached, hence increasing the rate of air filtration. For example, in a situation of degraded air quality levels due to an increase in 2.5 um particle concentration, the fan speed increase is beneficial because that will increase the airflow through the filter, hence the filtration rate, and eventually reduce the concentration of particulate matter in the air. Since the quiet mode efficiently acts as limiting the highest speed the fan can develop, in the case of elevated pollution levels, an increase to that limiting value to a certain extent may be permitted to allow a higher rate of filtration. On the other hand, the noise pollution signals try to minimize the fan speed upper limit, because exposure to prolonged periods of purifier noise can disturb the room occupants. However, if a motion is detected in the room, the quiet state may be triggered, whereby the upper limit is set to a predefined value, determined by the user preference. This state may be maintained, for example, until a certain period of time without motion in the room is detected. Then the quiet mode controller 420 may return to the idle state, as determined by the timer state.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. An air purifier comprising:
   a housing;
   a filter within the housing;
   a motorized fan within the housing positioned to draw air into the housing and through the filter, and to exhaust filtered air from the housing; and
   a control system comprising:
   an occupancy-aware controller; and
   a speed controller operatively connected to the occupancy-aware controller, the speed controller being configured to determine whether a space is occupied as a function of an input signal, and to provide a control signal for causing said motorized fan to operate at a decreased fan speed when the speed controller determines that the space is occupied;
   wherein the speed controller comprises a quiet mode controller that receives a first motion detect signal from the occupancy-aware controller, a second noise cost signal, and third noise pollution signal, and determines a fan speed based on consideration of the first, second and third signals;
   wherein the noise cost signal is determined from a fan speed and a filter pressure, and the noise pollution signal is determined from an ambient noise amplitude and frequency.

2. The air purifier of claim 1, wherein the occupancy-aware controller comprises a presence sensor and the input signal is provided by the presence sensor.

3. The air purifier of claim 2, wherein the presence sensor comprises at least one of an infrared sensor, a Bluetooth® receiver, a lidar sensor, and a radar sensor.

4. The air purifier of claim 1, wherein the occupancy-aware controller comprises a carbon dioxide sensor and the input signal is provided by the carbon dioxide sensor.

5. The air purifier of claim 4, wherein the carbon dioxide sensor comprises at least one of an infrared-based photo sensor and a metal oxide semiconductor-based sensor.

6. The air purifier of claim 1, wherein the occupancy-aware controller comprises a presence sensor and a carbon dioxide sensor.

7. The air purifier of claim 1, wherein the control system further comprises an AQI sensor and the speed controller receives a second input signal from the AQI sensor.

8. A control system for an air purifier, the control system comprising:
   an occupancy-aware controller; and
   a speed controller operatively connected to the occupancy-aware controller, the speed controller being configured to determine whether a space is occupied as a function of an input signal, and to provide a control signal for causing a fan to operate at a decreased fan speed when the speed controller determines that the space is occupied;

wherein the speed controller comprises a quiet mode controller that receives a first motion detect signal from the occupancy-aware controller, a second noise cost signal, and third noise pollution signal, and determines a fan speed based on consideration of the first, second and third signals;

wherein the noise cost signal is determined from a fan speed and a filter pressure, and the noise pollution signal is determined from an ambient noise amplitude and frequency.

9. The control system of claim 8, wherein the occupancy-aware controller comprises a presence sensor and the input signal is provided by the presence sensor.

10. The control system of claim 9, wherein the presence sensor comprises at least one of an infrared sensor, a Bluetooth® receiver, a lidar sensor, and a radar sensor.

11. The control system of claim 8, wherein the occupancy-aware controller comprises a carbon dioxide sensor and the input signal is provided by the carbon dioxide sensor.

12. The control system of claim 11, wherein the carbon dioxide sensor comprises at least one of an infrared-based photo sensor and a metal oxide semiconductor-based sensor.

13. The control system of claim 8, wherein the occupancy-aware controller comprises a presence sensor and a carbon dioxide sensor.

14. The control system of claim 8, wherein the control system further comprises an AQI sensor and the speed controller receives a second input signal from the AQI sensor.

15. A method of operating an air purifier, comprising the steps of:
   generating an occupancy signal indicating whether an ambient space associated with the air purifier is occupied or unoccupied by one or more humans;
   generating a noise cost signal based on a fan speed and a filter pressure;
   generating a noise pollution signal based an ambient noise level and frequency;
   setting a fan speed of the air purifier based on the occupancy signal, the noise cost signal, and the noise pollution signal.

* * * * *